(12) United States Patent
Hayashi et al.

(10) Patent No.: US 11,286,385 B2
(45) Date of Patent: Mar. 29, 2022

(54) EPOXY RESIN COMPOSITION, CURABLE RESIN COMPOSITION, AND FIBER-REINFORCED COMPOSITE MATERIAL

(71) Applicant: DIC Corporation, Tokyo (JP)

(72) Inventors: Koji Hayashi, Ichihara (JP); Nana Sugimoto, Ichihara (JP); Kunihiro Morinaga, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 16/765,000

(22) PCT Filed: Nov. 8, 2018

(86) PCT No.: PCT/JP2018/041461
§ 371 (c)(1),
(2) Date: May 18, 2020

(87) PCT Pub. No.: WO2019/102853
PCT Pub. Date: May 31, 2019

(65) Prior Publication Data
US 2020/0308393 A1 Oct. 1, 2020

(30) Foreign Application Priority Data
Nov. 22, 2017 (JP) .............................. JP2017-224630

(51) Int. Cl.
*C08L 63/00* (2006.01)
*C08J 5/04* (2006.01)

(52) U.S. Cl.
CPC ................. *C08L 63/00* (2013.01); *C08J 5/04* (2013.01); *C08J 2363/00* (2013.01); *C08J 2463/00* (2013.01)

(58) Field of Classification Search
CPC ......... C08L 63/00; C08J 5/04; C08J 2363/00; C08J 2463/00
(Continued)

(56) References Cited

U.S. PATENT DOCUMENTS

| | | | | |
|---|---|---|---|---|
| 3,957,905 A | * | 5/1976 | Sumoto ................ | C08K 3/2279 524/411 |
| 2004/0122208 A1 | * | 6/2004 | Okada .................. | C08G 59/681 528/408 |
| 2018/0051125 A1 | | 2/2018 | Aoki et al. | |

FOREIGN PATENT DOCUMENTS

| | | |
|---|---|---|
| JP | 2010-163573 A | 7/2010 |
| WO | 16/148175 A1 | 9/2016 |

OTHER PUBLICATIONS

Aouf et al., "Study of the O-glycidylation of natural phenolic compounds. The relationship between the phenolic structure and the reaction mechanism", Tetrahedron, 2013, vol. 69, p. 1345-1353 (Year: 2013).*

(Continued)

*Primary Examiner* — David T Karst
(74) *Attorney, Agent, or Firm* — Locke Lord LLP; James E. Armstrong, IV; Nicholas J. DiCeglie, Jr.

(57) ABSTRACT

The present invention provides an epoxy resin composition that contains an epoxy resin (A) that is a product of reaction between an epihalohydrin and either catechol, optionally with its aromatic ring methyl-substituted, or pyrogallol, optionally with its aromatic ring methyl-substituted, and an aromatic glycidylamine epoxy resin (B). This epoxy resin composition is suitable for use in fiber-reinforced composite materials, fiber-reinforced plastic articles, etc., by virtue of being liquid at room temperature, being superior in quick curing, and high mechanical properties in its cured form.

14 Claims, 2 Drawing Sheets

(58) Field of Classification Search
USPC .......................................................... 524/16
See application file for complete search history.

(56) References Cited

OTHER PUBLICATIONS

International Search Report dated Jan. 22, 2019, issued for PCT/JP2018/041461.

* cited by examiner

EPOXY RESIN COMPOSITION, CURABLE RESIN COMPOSITION, AND FIBER-REINFORCED COMPOSITE MATERIAL

TECHNICAL FIELD

The present invention relates to a curable resin composition that cures quickly, has high mechanical properties in its cured form, and is liquid at room temperature, to its cured form, to a fiber-reinforced composite material, to a fiber-reinforced plastic article, and to a method for producing a fiber-reinforced plastic article.

BACKGROUND ART

Fiber-reinforced plastic articles, reinforced with reinforcing fiber, have been increasingly used in the body and components of automobiles, aircraft, watercraft, etc., and many other structural and construction applications owing to their noteworthy features, such as being superior in mechanical strength despite being lightweight. Fiber-reinforced plastic articles can be produced by shaping a fiber-reinforced composite material by a shaping method such as filament winding, stamping, hand lay-up, pultrusion, or RTM.

The fiber-reinforced composite material is a material obtained by impregnating reinforcing fiber with resin. Resin in a fiber-reinforced composite material needs to be, for example, stable at ordinary temperature and durable and strong in its cured form; therefore, the resin is usually a thermosetting resin in many cases. Given that reinforcing fiber is impregnated with the resin as mentioned above, resins with lower viscosities are better. If the shaping process uses a metal mold or any such tool, furthermore, shortening the time from the start of heating to the strippable state is necessary if the manufacturer wants to improve productivity. The resin is therefore required to be a quick-curing composition.

The intended use of the fiber-reinforced plastic article also determines the required characteristics of the resin or resin composition. For example, if the fiber-reinforced plastic article is to be used as a structural component for an engine or the core material of a power line, a resin superior in heat resistance and mechanical strength in its cured form is required so that the article will be able to withstand the harsh environment of use for a long period of time.

Examples of widely known resin compositions for fiber-reinforced composite materials include epoxy resin compositions containing a bisphenol epoxy resin, an acid anhydride, and an imidazole compound (for example, see PTL 1). There have also been provided epoxy resin compositions made by combining a set of a glycidyl ether of a dihydric phenol and a glycidylamine epoxy resin with a curing agent (for example, see PTL 2).

The epoxy resin compositions provided in PTL 1 and 2 above penetrate well into reinforcing fiber and perform well to a certain extent in terms of heat resistance and mechanical strength in their cured form. Against a background of a growing demand for quick curing combined with mechanical strength in cured form, however, there is a need for better resins or resin compositions.

CITATION LIST

Patent Literature

PTL 1: Japanese Unexamined Patent Application Publication No. 2010-163573
PTL 2: International Publication No. 2016/148175

SUMMARY OF INVENTION

Technical Problem

The problem to be solved by the present invention therefore lies in providing a curable resin composition that cures quickly, has high mechanical properties in its cured form, and is liquid at room temperature, its cured form, a fiber-reinforced composite material, a fiber-reinforced plastic article, and a method for producing a fiber-reinforced plastic article.

Solution to Problem

After extensive research to solve the above problem, the inventors found that the problem can be solved by combining an epoxy resin that is a product of reaction between either catechol or pyrogallol and an epihalohydrin with an aromatic glycidylamine epoxy resin and using this combination with a curing agent, resulting in the completion of the present invention.

That is, the present invention provides an epoxy resin composition that contains an epoxy resin (A) that is a product of reaction between an epihalohydrin and either catechol, optionally with its aromatic ring methyl-substituted, or pyrogallol, optionally with its aromatic ring methyl-substituted, and an aromatic glycidylamine epoxy resin (B), and also provides a curable resin composition made by combining this composition with a curing agent. The cured form of the curable resin composition, a fiber-reinforced composite material made with the curable resin composition, a fiber-reinforced plastic article, and a method for producing a fiber-reinforced plastic article are also provided.

Advantageous Effects of Invention

According to the present invention, one can provide a curable resin composition that is liquid at room temperature, is superior in quick curing, and has high mechanical properties in its cured form and can also provide its cured form. A fiber-reinforced composite material, a fiber-reinforced plastic article, and a method for producing a fiber-reinforced plastic article can also be provided.

DESCRIPTION OF EMBODIMENTS

An epoxy resin composition according to the present invention contains an epoxy resin (A) that is a product of reaction between an epihalohydrin and either catechol, optionally with its aromatic ring methyl-substituted, or pyrogallol, optionally with its aromatic ring methyl-substituted, and an aromatic glycidylamine epoxy resin (B).

Catechol is a dihydroxybenzene having hydroxyl groups in positions 1 and 2, and pyrogallol is a trihydroxybenzene having hydroxyl groups in positions 1, 2, and 3. In the present invention, the benzene ring of each of them may be methyl-substituted. If methyl-substituted, the benzene ring may have any number of substituents at any position(s). If better mechanical properties in cured form are wanted, it is preferred that the benzene ring have one methyl group in position 4 if catechol is used, or have one methyl group in position 5 if pyrogallol is used. Either way, it is the most preferred that the benzene ring be unsubstituted. Catechol and pyrogallol may be used in combination or may be used alone, and it is also possible to use a combination of multiple compounds differing in the position(s) of the methyl group(s). If superior heat resistance of the cured composition is a particular interest, it is preferred to use a product of reaction between pyrogallol having no methyl group and an epihalohydrin.

When catechol optionally with its aromatic ring methyl-substituted or pyrogallol optionally with its aromatic ring methyl-substituted is allowed to react with an epihalohydrin, reaction proceeds to turn each of the aforementioned hydroxyl groups into a glycidyl ether group. Along with that reaction, however, oligomerization proceeds through reaction between glycidyl ether groups and unreacted hydroxyl groups, or the epihalohydrin undergoes addition reaction. These and various reaction conditions, such as the cyclization step of the addition reaction, give a wide variety of reaction products, and these will be contained as by-products. It would be possible to remove these by-products from the reaction system or reaction product, but in industrial settings, a step of isolating a single component (e.g., diglycidyl ether in the case of catechol or triglycidyl ether in the case of pyrogallol) is a troublesome step and also has direct impact on the product cost. In many cases, therefore, the product is used as an epoxy resin with by-products contained therein unless they have adverse effects on the cured composition.

The single component mentioned above (e.g., diglycidyl ether in the case of catechol or triglycidyl ether in the case of pyrogallol), furthermore, is highly crystalline. If an epoxy resin composition or curable resin composition is made with it, therefore, handling issues may arise. Given these, it is preferred to allow certain amounts of by-products as stated above in the epoxy resin, for handling reasons or in terms of ensuring, for example, the mechanical strength of the cured composition.

For these reasons, the epoxy resin (A) used in the present application is preferably one that contains a cyclic compound (a1) that has a cyclic structure whose constituent atoms include two adjacent oxygen atoms derived from either the catechol optionally with its aromatic ring methyl-substituted or pyrogallol optionally with its aromatic ring methyl-substituted. More preferably, this cyclic compound (a1) is between 0.040 and 0.115 mol per 100 g of the epoxy resin (A) in particular. This is preferred in terms of handling especially if the resin is made with pyrogallol with an unsubstituted aromatic ring. In that case, the presence of a certain amount of such a cyclic compound (a1) prevents the epoxy resin (A) from crystallizing for a long period of time even if the resin is left at room temperature.

The cyclic compound (a1) can be of any kind, but examples include the compounds represented by the following structural formulae.

[Chem. 1]

In the formulae, each R is independently a hydrogen atom or methyl group, each $R^1$ is independently a hydrogen atom or methyl group, m is an integer of to 4, and n is an integer of 1 to 3.

One such cyclic compound may be contained alone, or two or more may be contained in combination.

The cyclic compound (a1) content is preferably between 0.040 and 0.115 mol, in particular between 0.050 and 0.115 mol, the most preferably between 0.070 and 0.115 mol, per 100 g of the epoxy resin (A). The presence of a cyclic compound in an amount in these ranges helps the composition develop suitable heat resistance in its cured form and is more effective in the aforementioned prevention of the crystallization of the epoxy resin. As mentioned herein, a "cyclic compound content" is a value measured by the method described in Examples. If two or more cyclic compounds are contained, "the cyclic compound content" is their total amount.

The cyclic compound (a1) content can be controlled by customizing the percentage loadings of the raw materials, the catalyst, the species of the solvent, and reaction conditions in the reaction with the epihalohydrin or the cyclization step, described later herein, as necessary.

The epoxy resin (A) used in the present invention can be of any type as long as its raw materials are an epihalohydrin and either catechol optionally with its aromatic ring methyl-substituted or pyrogallol optionally with its aromatic ring methyl-substituted. However, it is preferred that the amount of the derived glycidyl ether (a2), represented by structural formula (1) or (2) below

[Chem. 2]

(1)

(2)

[In formulae (1) and (2), G is a glycidyl group, each $R^1$ is independently a hydrogen atom or methyl group, m is an integer of 1 to 4, and n is an integer of 1 to 3.],
be, in terms of the heat resistance and mechanical properties of the cured composition, 55% or more when expressed as a percentage area in GPC, more preferably 65% or more, even more preferably 70% or more, in particular 78% or more, the most preferably between 80% and 95%. This makes the resulting composition flows well, makes it easier to ensure that the composition is liquid even at room temperature, and leads to better mechanical properties of the cured composition. As mentioned herein, a "percentage area in GPC" is the percentage of the area occupied by the compound of interest in a GPC chart obtained by GPC of the reaction product. Specifically, it can be measured by the method described in Examples.

The epoxy resin (A) used in the present invention may contain oligomers. Since oligomers tend to cause an increase in viscosity, the oligomer content is preferably 12% or less, in particular 10% or less, when expressed as a percentage area in GPC in the same sense as described above. Oligomers is a generic term for polynuclear compounds having two or more benzene rings per molecule derived from the raw-material catechol or pyrogallol, and the oligomer content indicates the total amount of such polynuclear compounds.

The epoxy resin (A) according to the present invention may contain extra by-products unless they eliminate the advantage of the present invention. Examples of extra by-products include compounds produced by partial conversion of the hydroxyl groups of the raw-material catechol or pyrogallol into glycidyl ethers and compounds formed as a result of partial, or stagnant, cyclization of the epihalohydrin, and more than one such compound may be contained. Specific examples include those represented by the following structural formulae.

[Chem. 3]

-continued

[Chem. 4]

-continued

In the formulae, each R is independently a hydrogen atom or methyl group, each $R^1$ is independently a hydrogen atom or methyl group, m is an integer of 1 to 4, and n is an integer of 1 to 3.

Preferably, the epoxy equivalent weight of the epoxy resin (A) used in the present invention is between 130 and 190 g/eq if the resin is made with catechol, or between 108 and 170 g/eq if the resin is made with pyrogallol because this leads to a viscosity that makes the composition easy to handle and for quick curing reasons. The viscosity of the epoxy resin (A) is preferably between 100 mPa·s and 800 mPa·s if the resin is made with catechol, or between 1500 mPa·s and 20000 mPa·s if the resin is made with pyrogallol.

The epoxy resin (A) used in the present invention is not limited to a particular production method. Known methods for creating a glycidyl ether using an epihalohydrin can be used.

The epihalohydrin can be of any kind, and examples include epichlorohydrin, epibromohydrin, β-methylepichlorohydrin, and β-methylepibromohydrin. One epihalohydrin may be used alone, or two or more may be used in combination. The use of epichlorohydrin is preferred because it reacts well with hydroxyl groups.

The amount of epihalohydrin used is not critical, but preferably is between 1.2 and 20 moles, more preferably between 1.5 and 10 moles, per mole of hydroxy groups in the raw-material catechol optionally with its aromatic ring methyl-substituted or pyrogallol optionally with its aromatic ring methyl-substituted. This makes it easier to control the amounts of by-products and is for a right balance with the yield.

Preferably, the reaction between the epihalohydrin and the raw-material catechol optionally with its aromatic ring methyl-substituted or pyrogallol optionally with its aromatic ring methyl-substituted has a step (1) of reacting them in the presence of a quaternary onium salt and/or a basic compound and a step (2) of cyclizing the reaction product obtained in step (1) in the presence of a basic compound for the sake of the yield of the intended epoxy resin (A).

In step (1), a reaction solvent can be of any kind, but examples include alcohols, such as methanol, ethanol, isopropyl alcohol, and butanol; ketones, such as acetone and methyl ethyl ketone; ethers, such as dioxane; dimethylsulfone; and dimethylsulfoxide. One solvent may be used alone, or two or more may be used in combination.

If a reaction solvent is used, its amount is preferably between 5 and 150 parts by mass, more preferably between 7.5 and 100 parts by mass, even more preferably between 10 and 50 parts by mass, per 100 parts by mass of the epihalohydrin.

The quaternary onium salt can be of any kind, but examples include quaternary ammonium salts and quaternary phosphonium salts. One quaternary onium salt alone or two or more in combination may be used.

Examples of quaternary ammonium salts include the chloride salts of the tetramethylammonium, methyltriethylammonium, tetraethylammonium, tributylmethylammonium, tetrabutylammonium, phenyltrimethylammonium, benzyltrimethylammonium, phenyltriethylammonium, benzyltriethylammonium, and benzyltributylammonium cations and the bromide salts of the tetramethylammonium, trimethylpropylammonium, tetraethylammonium, and tetrabutylammonium cations.

Examples of quaternary phosphonium salts include the bromide salts of the tetraethylphosphonium, tetrabutylphosphonium, methyltriphenylphosphonium, tetraphenylphosphonium, ethyltriphenylphosphonium, butyltriphenylphosphonium, and benzyltriphenylphosphonium cations.

Of these, the chloride salts of the tetramethylammonium, benzyltrimethylammonium, and benzyltriethylammonium cations and the bromide salt of the tetrabutylammonium cation are preferred for use as the quaternary onium salt.

The amount of quaternary onium salt used is preferably between 0.15% and 5% by mass, more preferably between 0.18% and 3% by mass, of the total mass of the raw-material epihalohydrin and either catechol optionally with its aromatic ring methyl-substituted or pyrogallol optionally with its aromatic ring methyl-substituted. This ensures the reaction will proceed well and helps reduce residual onium salt in the product.

Examples of basic compounds include potassium hydroxide, sodium hydroxide, barium hydroxide, magnesium hydroxide, sodium carbonate, and potassium carbonate. One basic compound alone or two or more in combination may be used. Of these, potassium hydroxide and sodium hydroxide are preferred for use.

The amount of basic compound added is not critical, but preferably is between 0.01 and 0.3 moles, more preferably between 0.02 and 0.2 moles, with respect to the number of moles of phenolic hydroxyl groups in the raw-material catechol optionally with its aromatic ring methyl-substituted or pyrogallol optionally with its aromatic ring methyl-substituted. This ensures the reaction will proceed well and helps reduce residual basic compound in the product.

The quaternary onium and the basic compound may be used alone or may be used in combination.

The reaction in step (1), described above, is a reaction in which the epihalohydrin is added primarily to phenolic hydroxyl groups. The reaction temperature in step (1) is preferably between 20° C. and 80° C., more preferably between 40° C. and 75° C. The reaction time in step (1) is preferably 0.5 hours or more, more preferably between 1 and 50 hours.

Step (2), described above, is a step of cyclizing the reaction product obtained in step (1) in the presence of a basic compound. Step (2) may be performed directly with the reaction product freshly obtained in step (1) or after partial or complete removal of unreacted epihalohydrin and reaction solvent present in the system.

Examples of basic compounds used in step (2) include potassium hydroxide, sodium hydroxide, barium hydroxide, magnesium hydroxide, sodium carbonate, and potassium carbonate. One basic compound alone or two or more in combination may be used. Of these, potassium hydroxide and sodium hydroxide are preferred for use.

The amount of basic compound used is not critical, but preferably is between 0.8 and 1.5 moles, more preferably between 0.9 and 1.3 moles, with respect to the number of moles of phenolic hydroxyl groups in the raw materials. Adding 0.8 moles or more of a basic compound is preferred because it can ensure the cyclization in step (2) will proceed favorably. Adding 1.5 moles or less of a basic compound, on the other hand, is preferred because it helps prevent or reduce side reactions. If step (1) is performed using a basic compound, it is preferred that the combined amount of basic compounds added, including that used in step (1), be as specified above.

The reaction temperature in step (2) is not critical, but preferably is between 30° C. and 120° C., more preferably between 25° C. and 80° C. The reaction time is not critical, but preferably is between 0.5 and 4 hours, more preferably between 1 and 3 hours.

Optionally, step (2) may be followed by, for example, the purification of the reaction product obtained.

The reaction product obtained via steps (1) and (2) contains a cyclic compound (a1) that has a cyclic structure whose constituent atoms include two adjacent oxygen atoms derived from the raw-material catechol or pyrogallol as mentioned above. Oligomers and extra by-products as described above are also contained. These cyclic compound, oligomers, etc., influence the characteristics of the epoxy resin (A) and the characteristics of its cured form.

The amounts of by-products can be controlled by, for example, as follows. As stated, step (1) is a step in which the epihalohydrin is added to phenolic hydroxyl groups. Under certain reaction conditions, however, a side reaction occurs to cyclize some 3-halogeno-2-hydroxypropyl ether groups, producing an intermediate having glycidyl and hydroxy groups. If this occurs, the intermediate obtained in that reaction produces a cyclic compound if reaction occurs within its molecules, or produces oligomers if reaction occurs between its molecules. Controlling the side reaction that produces the intermediate having glycidyl and hydroxy groups in step (1) is therefore an easy way to control the amounts of the cyclic compound and oligomers. For example, performing step (1) under high-temperature conditions facilitates the side reaction that produces glycidyl groups, increasing the cyclic compound and oligomer content of the resulting reaction product. Performing step (1) under low-temperature conditions, by contrast, causes the reaction that produces glycidyl groups to be relatively inhibited, reducing the cyclic compound and oligomer content of the resulting reaction product. Performing step (1) for a short time, moreover, tends to result in higher cyclic compound and oligomer content of the reaction product because it leaves many unreacted hydroxy groups that will react with formed glycidyl groups in step (2).

The control of the amount of each component in the reaction product can be achieved by various methods. For example, in step (1), the reaction can be controlled by customizing parameters such as the proportions of the raw materials used, the species of the epihalohydrin and how to add it (duration), the species and amount of the quaternary onium salt and/or basic compound, the reaction temperature, and the reaction time. Alternatively, the reaction in step (1) can be controlled by, for example, adding or removing a raw material, the product, etc. In step (2), the reaction can be controlled by customizing parameters such as the species and amount of the basic compound, the reaction temperature, the reaction time, and the rate of reaction. The reaction in step (2), moreover, can be controlled by, for example, adding or removing materials such as the product. In this way, the amount of each component in the reaction product can be controlled.

The tailoring of the composition and characteristics of the epoxy resin may be achieved through the control of reactions, may be achieved through the control of a purification step, or may be achieved through the addition of extra ingredients. Preferably, the amounts of the components of the epoxy resin are adjusted through the control of reactions because this helps prepare the epoxy resin efficiently.

Aromatic glycidylamine epoxy resins (B), used in the present invention, are known to be superior in heat resistance and mechanical characteristics in their cured form. However, it is also well known that these advantages, usually, are easily lost when such a resin is used in combination with any other epoxy resin. The inventors found that the use of an aromatic glycidylamine epoxy resin (B) in combination with an epoxy resin (A) as described above leads to better mechanical characteristics in cured form than would be with the resin (B) alone, and that the combination is also superior in a balance between the mechanical characteristics and quick curing. Based on these findings, the inventors completed the present invention.

An aromatic glycidylamine epoxy resin (B) used in the present invention is an epoxy resin that has a glycidyl group bound with a nitrogen atom and also has at least one aromatic ring in its molecule. It may be a synthesized one, or a commercially available one may be used directly.

Examples of aromatic glycidylamine epoxy resins (B) include N,N-diglycidylaniline, N,N-diglycidyl-2-methylbenzenamine, N,N-diglycidyl-4-(glycidyloxy)aniline, N,N-diglycidyl-3-(glycidyloxy)aniline, N,N-diglycidyl-3-(glycidyloxy)-5-methylaniline, N,N-diglycidyl-4-(glycidyloxy)-2-methylaniline, N,N,N',N'-tetraglycidyl-1,3-benzenedi(methanamine), N,N,N',N'-tetraglycidyl-1,4-benzenedi(methanamine), N,N,N',N'-tetraglycidyldiphenylmethanediamine, 4,4'-methylenebis(N,N-diglycidylaniline), 4,4'-methylenebis(N,N-diglycidyl-2-methylaniline), 4,4'-methylenebis(N,N-diglycidyl-3-methylaniline), 4,4'-[1,4-phenylenebis(dimethylmethylene)]bis(N,N-diglycidylaniline), 4,4'-[1,4-phenylenebis(dimethylmethylene)]bis(N,N-bisglycidyl-2,6-dimethylaniline), and 4,4'-[(1,4-phenylene)bisoxy]bis(N,N-diglycidylaniline). One aromatic glycidylamine epoxy resin (B) or two or more in combination may be used.

Of these, it is particularly preferred to use one or more selected from N,N-diglycidyl-4-(glycidyloxy)aniline, N,N-diglycidyl-3-(glycidyloxy)aniline, N,N-diglycidyl-4-(glycidyloxy)-2-methylaniline, 4,4'-methylenebis(N,N-diglycidylaniline), 4,4'-methylenebis(N,N-diglycidyl-2-methylaniline), 4,4'-methylenebis(N,N-diglycidyl-3-methylaniline), 4,4'-[1,4-phenylenebis(dimethylmethylene)]bis(N,N-diglycidylaniline), and 4,4'-[1,4-phenylenebis(dimethylmethylene)]bis(N,N-bisglycidyl-2,6-dimethylaniline), in particular 4,4'-methylenebis(N,N-diglycidylaniline). This leads to better heat resistance of the cured composition. If a high elastic modulus is a priority, it is preferred to use one or more selected from 4,4'-methylenebis(N,N-diglycidylaniline), 4,4'-methylenebis(N,N-diglycidyl-2-methylaniline), 4,4'-methylenebis(N,N-diglycidyl-3-methylaniline), and 4,4'-[1,4-phenylenebis(dimethylmethylene)]bis(N,N-bisglycidyl-2,6-dimethylaniline).

In the present invention, the blend ratio between the epoxy resin (A) that is a product of reaction between an epihalohydrin and either catechol optionally with its aromatic ring methyl-substituted or pyrogallol optionally with its aromatic ring methyl-substituted and the aromatic glycidylamine epoxy resin (B) is preferably between 5/95 and 95/5, in particular between 10/90 and 90/10, when expressed as a ratio by mass represented by (A)/(B). This leads to better mechanical properties and quick curing of the cured composition.

The epoxy resin composition according to the present invention may contain extra epoxy resins, or epoxy resins other than the epoxy resins (A) and (B), unless they eliminate the advantage of the present invention. Examples of extra epoxy resins include other species of diglycidyloxybenzene, diglycidyloxynaphthalene, biphenol epoxy resins, bisphenol epoxy resins, novolac epoxy resins, triphenolmethane epoxy resins, tetraphenylethane epoxy resins, phenol or naphthol aralkyl epoxy resins, phenylene or naphthylene ether epoxy resins, epoxy resins produced by dicyclopentadiene-phenol addition reaction, epoxy resins produced by co-condensation between a phenolic hydroxyl-containing compound and an alkoxy-containing aromatic compound, and epoxy resins containing a naphthalene structure other than these.

Examples of biphenol epoxy resins include polyglycidyl ethers produced by reacting a biphenol compound, such as biphenol or tetramethylbiphenol, with an epihalohydrin. In particular, those having an epoxy equivalent weight of 150 to 200 g/eq are preferred.

Examples of bisphenol epoxy resins include polyglycidyl ethers produced by reacting a bisphenol compound, such as bisphenol A, bisphenol F, or bisphenol S, with an epihalohydrin. In particular, those having an epoxy equivalent weight of 158 to 200 g/eq are preferred.

Examples of novolac epoxy resins include polyglycidyl ethers produced by reacting a novolac resin made with one or more than one of phenolic compounds, such as phenol, cresol, naphthol, bisphenol, and biphenol, with an epihalohydrin.

Examples of triphenolmethane epoxy resins include those having a structural element represented by structural formula (3) below as its repeating unit.

[Chem. 5]

(3)

[In the formula, each of $R^5$ and $R^6$ is independently a hydrogen atom or a binding site that connects to a structural element represented by structural formula (3) via the methine group labeled with an * mark. n is an integer of 1 or more.]

Examples of phenol or naphthol aralkyl epoxy resins include those having a molecular structure in which glycidyloxybenzene or glycidyloxynaphthalene structures are tied together by a structural element represented by any of structural formulae (4-1) to (4-3) below.

[Chem. 6]

(4-1)
(4-2)
(4-3)

(In the formulae, X is any of a C2-6 alkylene group, an ether bond, a carbonyl group, a carbonyloxy group, a sulfide group, and a sulfone group.]

Examples of epoxy resins containing a naphthalene structure include the epoxy compounds represented by any of structural formulae (5-1) to (5-3) below.

[Chem. 7]

(5-1)

(5-2)

(5-3)

Of these extra epoxy resins, any of bisphenol epoxy resins, triphenolmethane epoxy resins, and epoxy resins containing a naphthalene structure is particularly preferred because these types of resins ensure a good balance between the composition's viscosity and heat resistance, mechanical strength, and low water absorbency in its cured form. Bisphenol epoxy resins are particularly preferred.

Preferably, in the epoxy resin composition according to the present invention, the amount of such extra epoxy resins is between 0.1% and 20% by mass, more preferably between 0.5% and 10% by mass, of the total mass of the epoxy resin (A), epoxy resin (B), and extra epoxy resins.

A curable resin composition according to the present invention contains an epoxy resin composition as described above and a curing agent (C).

Preferably, the curable resin composition according to the present invention is made with an amine compound (C1) as a curing agent (C). This ensures the composition is liquid at room temperature and helps the composition cure quickly.

The amine compound (C1) acts as a curing agent or curing accelerator for the epoxy resin composition. One amine compound (C1) may be used alone, or two or more may be used in combination. Specific examples of amine compounds (C1) include aliphatic amine compounds, such as ethylenediamine, N,N,N',N'-tetramethylethylenediamine, propylenediamine, N,N,N',N'-tetramethylpropylenediamine, dimethylaminopropylamine, diethylaminopropylamine, dibutylaminopropylamine, diethylenetriamine, N,N,N',N'',N''-pentamethyldiethylenetriamine, triethylenetetramine, tetraethylenepentamine, 3,3'-diaminodipropylamine, butanediamine, pentanediamine, hexanediamine, trimethylhexanediamine, N,N,N',N'-tetramethylhexanediamine, bis(2-dimethylaminoethyl)ether, dimethylaminoethoxyethoxyethanol, triethanolamine, dimethylaminohexanol, and 3,9-bis(3-aminopropyl)-2,4,8,10-tetraoxyspiro(5,5)undacane adducts;

amine compounds containing a cyclic ring, such as N,N-dimethylcyclohexylamine, p-menthane-1,8-diamine, and isophoronediamine, 4,4'-diaminodicyclohexylmethane;

amine compounds having a polyoxyalkylene structure in their molecular structure, such as polyoxyethylenediamine and polyoxypropylenediamine;

heterocyclic amine compounds, such as pyrrolidine, piperidine, piperazine, N,N'-dimethylpiperazine, N-aminoethylpiperazine, N,N',N'-trimethylaminoethylpiperazine, morpholine, methylmorpholine, ethylmorpholine, quinuclidine (1-azabicyclo[2.2.2]octane), triethylenediamine (1,4-diazabicyclo[2.2.2]octane), pyrrole, pyrazole, pyridine, hexahydro-1,3,5-tris(3-dimethylaminopropyl)-1,3,5-triazine, and 1,8-diazabicyclo-[5.4.0]-7-undecene;

amine compounds containing an aromatic ring, such as phenylenediamine, diaminodiphenylmethane, diaminodiphenylsulfone, N-methylbenzylamine, N,N-dimethylbenzylamine, diethyltoluenediamine, xylylenediamine, α-methylbenzylmethylamine, and 2,4,6-tris(dimethylaminomethyl)phenol;

imidazole compounds, such as imidazole, 1-methylimidazole, 2-methylimidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1H-imidazole, 4-methyl-2-phenyl-1H-imidazole, 2-phenyl-4-methylimidazole, 1-benzyl-2-methylimidazole, 1-benzyl-2-phenylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, the 2-phenylimidazole isocyanuric acid adduct, the 2-methylimidazole isocyanuric acid adduct, 2-phenyl-4,5-dihydroxymethylimidazole, 2-phenyl-4-methyl-5-hydroxymethylimidazole, 1-cyanoethyl-2-phenyl-4,5-di(2-cyanoethoxy)methylimidazole, 1-dodecyl-2-methyl-3-benzylimidazolium chloride, and 1-benzyl-2-phenylimidazole hydrochloride; and imidazoline compounds, such as 2-methylimidazoline and 2-phenylimidazoline. Of these, it is particularly preferred to use amine compound(s) containing an aromatic ring, in particular diaminodiphenylsulfone. It leads to better heat resistance and mechanical properties of the cured composition.

The blend proportions of the epoxy resin (A), epoxy resin (B), and optional extra epoxy resins and the amine compound (C1) are not critical and can be adjusted as needed for the desired performance of the cured composition and the purpose of use. To take an example of a blend, if the amine compound (C1) is, for example, an amine compound that is neither a tertiary amine nor an imidazole or imidazoline compound as described above, it is preferred that the total number of moles of active hydrogens in the amine compound (C1) be between 0.5 and 1.05 moles per mole of epoxy groups in the epoxy resin composition.

If the amine compound (C1) is either a tertiary amine or an imidazole or imidazoline compound as described above, it is preferred that the amine compound (C1) be contained to an extent that its percentage in the curable resin composition is between 0.1% and 10% by mass.

In the present invention, an extra curing agent or curing accelerator (C') may be used together with the amine compound (C1). The extra curing agent or curing accelerator (C') can be any of those various compounds that are commonly used as curing agents or curing accelerators for epoxy resins. Specific examples include acid anhydrides, such as tetrahydrophthalic anhydride, methyltetrahydrophthalic anhydride, hexahydrophthalic anhydride, methylhexahydrophthalic anhydride, methylendoethylenetetrahydrophthalic anhydride, trialkyltetrahydrophthalic anhydrides, methyl nadic anhydride, phthalic anhydride, trimellitic anhydride, pyromellitic anhydride, and maleic anhydride;

dicyandiamide and amide compounds obtained by reacting an amine compound (C1) as described above with an aliphatic dicarboxylic acid, such as succinic acid, glutaric acid, adipic acid, pimelic acid, suberic acid, or azelaic acid, or a carboxylic acid compound, such as a fatty acid or dimer acid;

polyhydroxybenzene, polyhydroxynaphthalene, biphenol compounds, bisphenol compounds, and phenolic resins, e.g., novolac phenolic resins made with one or multiple phenolic compounds, such as phenol, cresol, naphthol, bisphenol, and/or biphenol, triphenolmethane phenolic resins, tetraphenolethane phenolic resins, phenol or naphthol aralkyl phenolic resins, phenylene or naphthylene ether phenolic resins, phenolic resins produced by dicyclopentadiene-phenol addition reaction, and phenolic resins produced by co-condensation between a phenolic hydroxyl-containing compound and an alkoxy-containing aromatic compound;

urea compounds, such as p-chlorophenyl-N,N-dimethylurea, 3-phenyl-1,1-dimethylurea, 3-(3,4-dichlorophenyl)-N,N-dimethylurea, and N-(3-chloro-4-methylphenyl)-N',N'-dimethylurea;

phosphorus compounds; organic acid metal salts; Lewis acids; and amine complex salts.

The blend proportions of the epoxy resin (A), epoxy resin (B), extra epoxy resins, amine compound (C1), and extra curing agent or curing accelerator (C') are not critical and can be adjusted as needed for the desired performance of the cured composition and the purpose of use.

The curable resin composition according to the present invention may contain extra resin components, or resin components other than the epoxy resin composition, amine compound (C1), and extra curing agent and curing accelerator (C'). Examples of extra resin components include acid-modified polybutadiene, polyethersulfone resin, polycarbonate resin, and polyphenylene ether resin.

Acid-modified polybutadiene is a component reactive with the epoxy resin components. The use of acid-modified polybutadiene helps ensure the composition develops superior mechanical strength, heat resistance, and wet heat resistance in its cured form.

Examples of acid-modified polybutadienes include ones having a 1,3-butadiene- or 2-methyl-1,3-butadiene-derived structure in a butadiene backbone. Examples of structures derived from 1,3-butadiene include ones having any of the 1,2-vinyl, 1,4-trans, and 1,4-cis structures and ones having two or more of these structures. Examples of structures derived from 2-methyl-1,3-butadiene include ones having any of the 1,2-vinyl, 3,4-vinyl, 1,4-cis, and 1,4-trans structures and ones having two or more of these structures.

The modifying acid component of the acid-modified polybutadiene can be of any kind, but an example is an unsaturated carboxylic acid. Preferred unsaturated carboxylic acids are acrylic acid, methacrylic acid, maleic acid, maleic anhydride, itaconic acid, and itaconic anhydride. Itaconic anhydride and maleic anhydride are preferred in terms of reactivity, and maleic anhydride is more preferred.

For the unsaturated carboxylic acid content of the acid-modified polybutadiene, the acid value of the acid-modified polybutadiene is preferably between 5 mg KOH/g and 400 mg KOH/g, more preferably between 20 mg KOH/g and 300 mg KOH/g, even more preferably between 50 mg KOH/g and 200 mg KOH/g, for the sake of reactivity with the epoxy resins if the polybutadiene is composed of a structure derived from 1,3-butadiene.

The unsaturated carboxylic acid component, moreover, only needs to have been copolymerized in the acid-modified polybutadiene, in any form. Examples include random copolymerization, block copolymerization, and graft copolymerization (graft modification).

The average molar mass of the acid-modified polybutadiene is preferably between 1,000 and 8,000, more preferably between 2,000 and 7,000, if the acid-modified polybutadiene is composed of a structure derived from 1,3-butadiene. If the acid-modified polybutadiene is composed of a structure derived from 2-methyl-1,3-butadiene, the average molar mass is preferably between 1,000 and 60,000, more preferably between 15,000 and 40,000. The average molar mass can be measured using gel permeation chromatography (GPC).

Although acid-modified polybutadiene is obtained by modifying polybutadiene with an unsaturated carboxylic acid, it is also possible to use a commercially available one directly. Examples of commercially available acid-modified polybutadienes that can be used include Evonik Degussa's maleic anhydride-modified liquid polybutadienes (polyvest MA75, Polyvest EP MA120, etc.) and Kuraray's maleic anhydride-modified polyisoprenes (LIR-403 and LIR-410).

For the acid-modified polybutadiene content of the curable resin composition, it is preferred that 1 part by mass to 40 parts by mass, more preferably 3 parts by mass to 30 parts by mass, of polybutadiene be contained when the total mass of the resin components of the curable resin composition is assumed to be 100 parts by mass. This ensures good elongation, heat resistance, and wet heat resistance of the cured composition. The total of the resin components of the curable resin composition represents the total of the epoxy resins, amine compound (C1), extra curing agent or curing accelerator (C'), and extra resin components.

Polyethersulfone resin is a thermoplastic resin. The polyethersulfone resin is not included in the crosslink network in the curing of the curable resin composition, but its superior reformer effect by virtue of having a high Tg ensures the composition develops better mechanical strength and heat resistance in its cured form.

For the polyethersulfone resin content of the curable resin composition, it is preferred that 1 part by mass to 30 parts by mass, more preferably 3 parts by mass to 20 parts by mass, of polyethersulfone resin be contained when the total mass of the resin components of the curable resin composition is assumed to be 100 parts by mass. This ensures good mechanical strength and heat resistance of the cured composition.

Examples of polycarbonate resins include polycondensates of a dihydric or bifunctional phenol and a halogenated carbonyl and dihydric or bifunctional phenols polymerized with a carbonic acid diester by transesterification.

Examples of dihydric or bifunctional phenols include 4,4'-dihydroxybiphenyl, bis(4-hydroxyphenyl)methane, 1,1-bis(4-hydroxyphenyl)ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)cyclohexane, bis(4-hydroxyphenyl)ether, bis(4-hydroxyphenyl)sulfide, bis(4-hydroxyphenyl)sulfone, bis(4-hydroxyphenyl)sulfoxide, bis(4-hydroxyphenyl)ketone, hydroquinone, resorcinol, and catechol. Of these dihydric phenols, bis(hydroxyphenyl)alkanes are particularly preferred. Polycarbonate resins made primarily with 2,2-bis(4-hydroxyphenyl)propane are particularly preferred.

As for the halogenated carbonyl or carbonic acid diester, to be reacted with the dihydric or bifunctional phenol, examples include phosgene; dihaloformates of dihydric phenols, diaryl carbonates, such as diphenyl carbonate, ditolyl carbonate, bis(chlorophenyl) carbonate, and m-cresyl carbonate; and aliphatic carbonate compounds, such as dimethyl carbonate, diethyl carbonate, diisopropyl carbonate, dibutyl carbonate, diamyl carbonate, and dioctyl carbonate.

The polycarbonate resin, moreover, can be one whose polymer chains have a linear molecular structure, and may further have a branched structure in addition to it. Such a branched structure can be introduced by using, for example, 1,1,1-tris(4-hydroxyphenyl)ethane, α,α',α"-tris(4-hydroxyphenyl)-1,3,5-triisopropylbenzene, phloroglucinol, trimellitic acid, or isatin bis(o-cresol) as a raw-material component.

Examples of polyphenylene ether resins include poly(2,6-dimethyl-1,4-phenylene) ether, poly(2-methyl-6-ethyl-14-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, and poly(2-methyl-6-hydroxyethyl-1,4-phenylene) ether.

Of these, poly(2,6-dimethyl-1,4-phenylene) ether is particularly preferred. The polyphenylene ether may be one that has a 2-(dialkylaminomethyl)-6-methylphenylene ether, 2-(N-alkyl-N-phenylaminomethyl)-6-methylphenylene ether, or similar unit as its substructure.

The polyphenylene ether resin can also be a modified polyphenylene ether resin unless it prevents the object of the present invention from being achieved. Such a modified resin is created by introducing a carboxyl, epoxy, amino, mercapto, silyl, hydroxyl, dicarboxylic anhydride, or other reactive functional group into the polymer structure of a polyphenylene ether resin by any method, for example by grafting or copolymerization.

When containing polycarbonate resin or polyphenylene ether resin as described above, the curable resin composition according to the present invention exhibits better mechanical strength in its cured form.

The curable resin composition according to the present invention can contain a flame retardant/flame retardant aid, filler, additives, an organic solvent, etc., unless they eliminate the advantage of the present invention. In the production of the curable resin composition, the order of blending is not critical as long as the advantage of the present invention is achieved by the method. That is, all ingredients may be mixed together before use, or the ingredients may be mixed and used in an as-needed order. As for the method of blending, the composition can be produced by, for example, mixing and kneading using a mixing machine, such as an extruder, heat rollers, a kneader, a roller mixer, or a Banbury mixer. The following describes components that can be contained in the curable resin composition according to the present invention.

Flame Retardant/Flame Retardant Aid

The curable resin composition according to the present invention may contain a non-halogen flame retardant, which is substantially free of halogen atoms, to be fire-retardant.

Examples of non-halogen flame retardants include phosphorus flame retardants, nitrogen flame retardants, silicone flame retardants, inorganic flame retardants, and organometallic salt flame retardants. There is not a limitation when they are used either; one may be used alone, multiple flame retardants of the same type may be used, or even different types of flame retardants can be used in combination.

For phosphorus flame retardants, both inorganic and organic ones can be used. Examples of inorganic compounds include red phosphorus, ammonium phosphates, such as monoammonium phosphate, diammonium phosphate, triammonium phosphate, and ammonium polyphosphate, and inorganic nitrogen-containing phosphorus compounds, such as phosphoramide.

Red phosphorus is preferably surface-treated for the prevention of, for example, hydrolysis. Examples of surface treatments include (i) coating with inorganic compound(s) such as magnesium hydroxide, aluminum hydroxide, zinc hydroxide, titanium hydroxide, bismuth oxide, bismuth hydroxide, bismuth nitrate, or a mixture thereof, (ii) coating with a mixture of an inorganic compound such as magnesium hydroxide, aluminum hydroxide, zinc hydroxide, or titanium hydroxide and a thermosetting resin, such as a phenolic resin, and (iii) double coating by coating with a thermosetting resin, such as a phenolic resin, over a coating of an inorganic compound such as magnesium hydroxide, aluminum hydroxide, zinc hydroxide, or titanium hydroxide.

Examples of organic phosphorus compounds include commonly used organic phosphorus compounds, such as phosphate compounds, phosphonic acid compounds, phosphinic acid compounds, phosphine oxide compounds, phosphorane compounds, and organic nitrogen-containing phosphorus compounds, and also include cyclic organic phosphorus compounds, such as 9,10-dihydro-9-oxa-10-phosphaphenanthrene=10-oxide, 10-(2,5-dihydrooxyphenyl)-10H-9-oxa-10-phosphaphenanthrene=10-oxide, and 10-(2,7-dihydroxynaphthyl)-10H-9-oxa-10-phosphaphenanthrene=10-oxide.

If a phosphorus flame retardant is used, furthermore, the phosphorus flame retardant may be used in combination with, for example, hydrotalcite, magnesium hydroxide, a boron compound, zirconium oxide, black dye, calcium carbonate, zeolite, zinc molybdate, or activated carbon.

Examples of nitrogen flame retardants include triazine compounds, cyanuric acid compounds, isocyanuric acid compounds, and phenothiazine. Triazine compounds, cyanuric acid compounds, and isocyanuric acid compounds are preferred.

Examples of triazine compounds include melamine, acetoguanamine, benzoguanamine, melon, melam, succinoguanamine, ethylene dimelamine, melamine polyphosphate, and triguanamine, and also include, for instance, aminotriazine sulfate compounds, such as guanylmelamine sulfate, melem sulfate, and melam sulfate, phenolic resins modified with any such aminotriazine, and aminotriazine-modified phenolic resins further modified with tung oil, isomerized linseed oil, or the like.

Specific examples of cyanuric acid compounds include cyanuric acid and melamine cyanurate.

The amount of nitrogen flame retardant added is selected as appropriate for the type of nitrogen flame retardant, the other ingredients of the curable resin composition, and the desired degree of flame retardancy. For example, it is preferred to add 0.05 parts by mass to 10 parts by mass, in particular 0.1 parts by mass to 5 parts by mass, in a total of 100 parts by mass of the resin components of the curable resin composition.

If a nitrogen flame retardant is used, furthermore, it may be used in combination with, for example, a metal hydroxide or molybdenum compound.

For silicone flame retardants, any silicon-containing organic compound can be used without particular limitations. Examples include silicone oils, silicone rubbers, and silicone resins.

The amount of silicone flame retardant added is selected as appropriate for the type of silicone flame retardant, the other ingredients of the curable resin composition, and the desired degree of flame retardancy. For example, it is preferred to add 0.05 parts by mass to 20 parts by mass in a total of 100 parts by mass of the resin components of the curable resin composition. If a silicone flame retardant is used, it may be used in combination with, for example, a molybdenum compound or alumina.

Examples of inorganic flame retardants include metal hydroxides, metal oxides, metal carbonate compounds, metal powders, boron compounds, and low-melting glass.

Specific examples of metal hydroxides include aluminum hydroxide, magnesium hydroxide, dolomite, hydrotalcite, calcium hydroxide, barium hydroxide, and zirconium hydroxide.

Specific examples of metal oxides include zinc molybdate, molybdenum trioxide, zinc stannate, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide, and tungsten oxide.

Specific examples of metal carbonate compounds include zinc carbonate, magnesium carbonate, calcium carbonate, barium carbonate, basic magnesium carbonate, aluminum carbonate, iron carbonate, cobalt carbonate, and titanium carbonate.

Specific examples of metal powders include aluminum, iron, titanium, manganese, zinc, molybdenum, cobalt, bismuth, chromium, nickel, copper, tungsten, and tin.

Specific examples of boron compounds include zinc borate, zinc metaborate, barium metaborate, boric acid, and borax.

Specific examples of low-melting glass include CEEPREE (Bokusui Brown), the hydrated glass $SiO_2$—MgO—$H_2O$, and vitreous compounds, for example in the PbO—$B_2O_3$, ZnO—$P_2O_5$—MgO, $P_2O_5$—$B_2O_3$—PbO—MgO, P—Sn—O—F, PbO—$V_2O_5$—$TeO_2$, $Al_2O_3$—$H_2O$, and lead borosilicate systems.

The amount of inorganic flame retardant added is selected as appropriate for the type of inorganic flame retardant, the other ingredients of the curable resin composition, and the desired degree of flame retardancy. For example, it is preferred to add 0.05 parts by mass to 20 parts by mass, in particular 0.5 parts by mass to 15 parts by mass, in a total of 100 parts by mass of the resin components of the curable resin composition.

Examples of organometallic salt flame retardants include ferrocene, metal acetylacetonate complexes, organometallic carbonyl compounds, organic cobalt salt compounds, organic metal sulfonates, and compounds formed by ionic or coordinate bonding between a metal atom and an aromatic or heterocyclic compound.

The amount of organometallic salt flame retardant added is selected as appropriate for the type of organometallic salt flame retardant, the other ingredients of the curable resin composition, and the desired degree of flame retardancy. For example, it is preferred to add 0.005 parts by mass to 10 parts by mass in a total of 100 parts by mass of the resin components of the curable resin composition.

Filler

The curable resin composition according to the present invention may contain filler. When containing filler, the curable resin composition according to the present invention exhibits better mechanical properties in its cured form.

Examples of fillers include titanium oxide, glass beads, glass flakes, glass fiber, calcium carbonate, barium carbonate, calcium sulfate, barium sulfate, potassium titanate, aluminum borate, magnesium borate, fused silica, crystalline silica, alumina, silicon nitride, and aluminum hydroxide, fibrous reinforcing agents, such as kenaf fiber, carbon fiber, alumina fiber, and quartz fiber, and non-fibrous reinforcing agents. One of these may be used alone, or two or more may be used in combination. These may be coated, for example with an organic or inorganic substance.

If glass fiber is used as filler, it can be selected for use from, for example, roving, formed by long filaments of glass, and chopped strands and milled fiber, which are short filaments. Preferably, the glass fiber is one coated for the resins used therewith. Filler added helps further improve the strength of the uninflammable layer (or carbonized layer) that forms when the composition is burnt. Once formed when the composition is burnt, the uninflammable layer (or carbonized layer) is less likely to be damaged and therefore insulates the composition from heat consistently, providing more effective flame retardancy. The filler, moreover, helps give the material high rigidity.

Additives

The curable resin composition according to the present invention may contain additives. When containing additives, the curable resin composition according to the present invention improves in other characteristics in its cured form, such as rigidity and dimensional stability. Examples of agents that can be added as additives also include plasticizers, stabilizers, such as antioxidants, ultraviolet absorbers, and photostabilizers, antistatic agents, electrically conductive agents, stress relaxants, release agents, crystallization accelerators, anti-hydrolysis agents, lubricants, impact agents, slip improvers, compatibilizers, nucleators, fortifiers, reinforcing agents, flow modifiers, dyes, sensitizing materials, pigments for coloring, rubbery polymers, thickening agents, anti-settling agents, anti-sagging agents, defoamers, coupling agents, antirusts, antibacterial agents/fungicides, antifouling agents, and electrically conductive polymers.

Organic Solvent

The curable resin composition according to the present invention may contain an organic solvent, for example if fiber-reinforced plastic articles are produced from it by filament winding. Examples of organic solvents that can be used here include methyl ethyl ketone acetone, dimethylformamide, methyl isobutyl ketone, methoxypropanol, cyclohexanone, methyl cellosolve, ethyl diglycol acetate, and propylene glycol monomethyl ether acetate. The choice and the proper amount of solvent used can be selected as appropriate for the purpose of use.

By virtue of having low viscosity, being superior in curability, and having high mechanical strength and heat resistance in its cured form, the curable resin composition according to the present invention can be used in various applications, including paints, electrical/electronic materials, adhesives, and shaped articles. The curable resin composition according to the present invention not only is used in applications in which the composition itself is cured, but also is suitable for use in, for example, a fiber-reinforced composite material or fiber-reinforced plastic article. The following describes these.

Cured Form of the Curable Resin Composition

How to turn the curable resin composition according to the present invention into its cured form is simply based on the ordinary method for curing an epoxy resin composition. For example, the heating temperature condition can be selected as appropriate, for example for the type of the curing agent used and for the purpose of use. An example is heating the curable resin composition in a temperature range of room temperature to approximately 250° C. For shaping and other types of processing, ordinary methods for curable resin compositions can be used; there is no particular requirement unique to the curable resin composition according to the present invention.

Fiber-Reinforced Composite Material

A fiber-reinforced composite material as mentioned in the present invention is a material made by impregnating reinforcing fiber with a curable resin composition and in which the composition has yet to be cured. The reinforcing fiber here can be of any type, e.g., twisted yarn, untwisted yarn (twisted and then untwisted), or non-twisted yarn (made without twisting), but untwisted or non-twisted yarn is preferred because it has superior shapability in fiber-reinforced composite materials. As for form, the reinforcing fiber can be an assembly of fibers stretched to align in one direction or a textile. A textile can be selected from a plain weave, a satin weave, etc., in accordance with where and for what purpose the composite material will be used. Specific examples include carbon fiber, glass fiber, aramid fiber, boron fiber, alumina fiber, and silicon carbide fiber because these are superior in mechanical strength and durability, and a combination of two or more of these can also be used. Of these, carbon fiber is particularly preferred because it gives good strength to shaped articles. The carbon fiber can be selected from different types, including polyacrylonitrile-based, pitch-based, and rayon-based carbon fibers.

It is not critical how to make the fiber-reinforced composite material from the curable resin composition according to the present invention. Examples include uniformly mixing the ingredients of the curable resin composition to produce varnish and then immersing unidirectional reinforcing fiber, or the reinforcing fiber stretched to align in one direction, in the varnish (the pre-cure state in the pultrusion or filament winding process), and also include setting stacked layers of textile of the reinforcing fiber in a female mold, then tightly closing with a male mold, and then impregnating the textile with injected resin under pressure (the pre-cure state in the RTM process).

In the fiber-reinforced composite material according to the present invention, the curable resin composition does not need to penetrate to reach the inside of fiber bundles; the composite material may be in a form in which the curable resin composition is localized near the surface of fibers.

Preferably, the fiber-reinforced composite material according to the present invention is one in which the percentage by volume of the reinforcing fiber to the total volume of the fiber-reinforced composite material is between 40% and 85%, more preferably between 50% and 70% for strength. If the volume percentage is less than 40%, the flame retardancy of the cured composition can be insufficient because of too much of the curable resin composition, and the composite material can lack some of the characteristics fiber-reinforced composite materials superior in specific modulus and specific strength are required to have. If the volume percentage exceeds 85%, the adhesiveness between the reinforcing fiber and the curable resin composition can be low.

Fiber-Reinforced Plastic Article

A fiber-reinforced plastic article as mentioned in the present invention is a shaped article that has reinforcing fiber and the cured form of a curable resin composition and is obtained by thermally curing a fiber-reinforced composite material. Specifically, the fiber-reinforced plastic article according to the present invention is preferably one in which the percentage by volume of the reinforcing fiber in the fiber-reinforced article is between 40% and 85%, more preferably between 50% and 70% for the sake of strength. Examples of such fiber-reinforced plastic articles include automobile components, such as the front subframe, rear subframe, front pillar, center pillar, side members, crossmember, side sills, roof rail, and propeller shaft, the core component of power lines, piping for deep-water oil fields, rollers/piping for printers, robotic forks, and primary and secondary structures of aircraft.

It is not critical how to make the fiber-reinforced article from the curable resin composition according to the present invention, but it is preferred to use, for example, pultrusion, filament winding, or RTM. Pultrusion is a process in which a fiber-reinforced composite material is introduced into a metal mold, cured by heating, and then pulled using a pull machine to form a fiber-reinforced plastic article. Filament winding is a process in which a fiber-reinforced composite material (including unidirectional fiber) is wound over a rotating element, such as an aluminum or plastic liner, and then cured by heating to form a fiber-reinforced plastic article. RTM is a process that uses two types of molds, female and male. In RTM, a fiber-reinforced composite material is cured by heating in the mold to form a fiber-reinforced plastic article. If a product of large size or a fiber-reinforced plastic article complicated in shape is formed, the use of RTM is preferred.

For the shaping conditions for the fiber-reinforced plastic article, the fiber-reinforced composite material is shaped by thermal curing preferably in a temperature range of 50° C. to 250° C., more preferably shaped in a temperature range of 70° C. to 220° C. This is because too low a shaping temperature can cause the composite material not to cure sufficiently fast, and the opposite, too high a shaping temperature, can cause problems like the article easily warping because of thermal strain. Other examples of shaping conditions include two-step curing, e.g., preliminary curing of the fiber-reinforced composite material at 50° C. to 100° C. to turn the material into a tack-free hard substance followed by treatment under temperature conditions of 120° C. to 200° C.

Other examples of methods for making a fiber-reinforced article from the curable resin composition according to the present invention include hand lay-up or spray-up, in which a fiber aggregate is placed in a metal mold, and varnish as mentioned above and fiber aggregates are stacked in layers, vacuum bagging, in which substrates made of reinforcing fiber are stacked and shaped while being impregnated with varnish using any of male and female molds, the shaped stack is covered with a flexible mold with which pressure can be applied to the stack, and the airtight sealed workpiece is shaped by drawing a vacuum (reducing the pressure), and SMC compression molding, in which a sheet of reinforcing fiber-containing varnish prepared beforehand is shaped by compression in a metal mold.

EXAMPLES

The following describes the present invention more specifically by examples and comparative examples. In the following, "parts" and "%" are by mass unless otherwise specified.

For GPC and $^{13}$CNMR, measurements were made under the following conditions.

<GPC Conditions>

Measuring instrument: Tosoh Corporation "HLC-8220 GPC,"

Columns: Tosoh Corporation "HXL-L" guard column
Tosoh Corporation "TSK-GEL G2000HXL"
Tosoh Corporation "TSK-GEL G2000HXL"
Tosoh Corporation "TSK-GEL G3000HXL"
Tosoh Corporation "TSK-GEL G4000HXL"
Detector: An RI (refractive index detector)
Data processing: Tosoh Corporation "GPC-8020 model II, version 4.10"
Measuring conditions: Column temperature, 40° C.
Developing solvent, tetrahydrofuran
Flow rate, 1.0 ml/min
Standards: The monodisperse polystyrenes listed below, each having a known molecular weight, were used in accordance with the measurement manual for "GPC-8020 model II, version 4.10."
(Polystyrenes Used)
Tosoh Corporation "A-500"
Tosoh Corporation "A-1000"
Tosoh Corporation "A-2500"
Tosoh Corporation "A-5000"
Tosoh Corporation "F-1"
Tosoh Corporation "F-2"
Tosoh Corporation "F-4"
Tosoh Corporation "F-10"
Tosoh Corporation "F-20"
Tosoh Corporation "F-40"
Tosoh Corporation "F-80"
Tosoh Corporation "F-128"
Samples: A tetrahydrofuran solution of 1.0% by mass resin on a solids basis filtered through a microfilter (50 μl).

<$^{13}$C-NMR Conditions>

Instrument: JEOL Ltd.'s JNM-ECA500
Measurement mode: Inverse gated decoupling
Solvent: Deuterated dimethylsulfoxide
Pulse angle: 300 pulses
Sample concentration: 30 wt %
Number of scans: 4000
Chemical shift reference: The peak for dimethylsulfoxide: 39.5 ppm <Viscosity Measurement>

The viscosity of the resulting curable resin composition was measured at 25° C. using a viscometer (TOKI SANGYO CO. LTD. VISCOMETER TV-22).

<Heat Resistance Test>

The resulting curable resin composition was poured into a frame measuring 90 mm wide, 110 mm long, and 2 mm thick, cured at 150° C. for 1 hour, and then cured at 180° C. for 3 hours. The cured composition was cut to a width of 5 mm and a length of 55 mm, and this served as a test specimen. Then using a rheometer (DMA: Rheometrics RSA II solids analyzer, the rectangular tension method; frequency, 1 Hz; heating rate, 3° C./min; maximum measuring temperature, 350° C.), the temperature was measured at which the loss tangent, i.e., the ratio between the storage and loss moduli, of the cured composition, peaked (tan δ was the largest), and this was reported as glass transition temperature (Tg).

The measurement conditions for the dynamic viscoelasticity measurement were set as follows: temperature conditions, room temperature to 300° C.; heating rate, 3° C./min; frequency, 1 Hz; strain amplitude, 10 μm.

<Measurement of Flexural Strength and Flexural Modulus>

The resulting curable resin composition was subjected to the measurement of the flexural strength, flexural modulus, and flexural strain of its cured form in accordance with JIS K7171. The S-S curve obtained in the bending test was integrated to give energy, and the amount of energy per unit area of the test specimen was reported as flexural toughness.

<Curability Test>

The curability was evaluated by gel time. One cubic centimeter of the resulting curable resin composition was poured over a hot plate at 180° C., the poured composition was stirred with a stirrer bar, and time was measured in that state until the epoxy resin composition lost its fluidity.

Synthesis Example 1

Step (1)

A flask fitted with a thermometer, a dropping funnel, a nitrogen tube, and a stirrer was loaded with 165 g (1.50 mol) of catechol and 1388 g (15 mol) of epichlorohydrin and heated to 50° C. Then 11.2 g (0.06 mol) of benzyltrimethylammonium chloride was added, and the mixture was stirred at 50° C. for 15 hours.

Step (2)

The reaction solution obtained in step (1) above was stirred with 1000 mL of distilled water, the resulting solution was allowed to stand, and then the upper layer was removed. Then 318 g of a 48% aqueous solution of sodium hydroxide was added dropwise over 2.5 hours, and the mixture was stirred for 1 hour.

The resulting solution was allowed to stand with 400 mL of distilled water. The sodium chloride water in the lower layer was removed, and the rest was distilled at 120° C. to collect epichlorohydrin. To the residue was added 566 g of methyl isobutyl ketone (MIBK) and then 167 g of water, and the substance was washed with the water at 80° C. The washing water in the lower layer was removed, then the residue was dehydrated and filtered, and the solvent MIBK was removed at 150° C. to give an epoxy resin. The resulting epoxy resin appeared to be liquid when observed visually.

For the resulting epoxy resin, the cyclic compound content X (mol) per 100 g of the epoxy resin was measured. Specifically, it was calculated using the following equation.

$$X=(100 \times A)/(B \times C) \quad [\text{Math. 1}]$$

In the above equation, X is the cyclic compound content (X) per 100 g of the epoxy resin, (A) is cyclic compounds (mol) per mol of aromatic rings, (B) is epoxy groups (mol) per mol of aromatic rings, and (C) is epoxy equivalent weight (g/equivalent).

Figure 1:
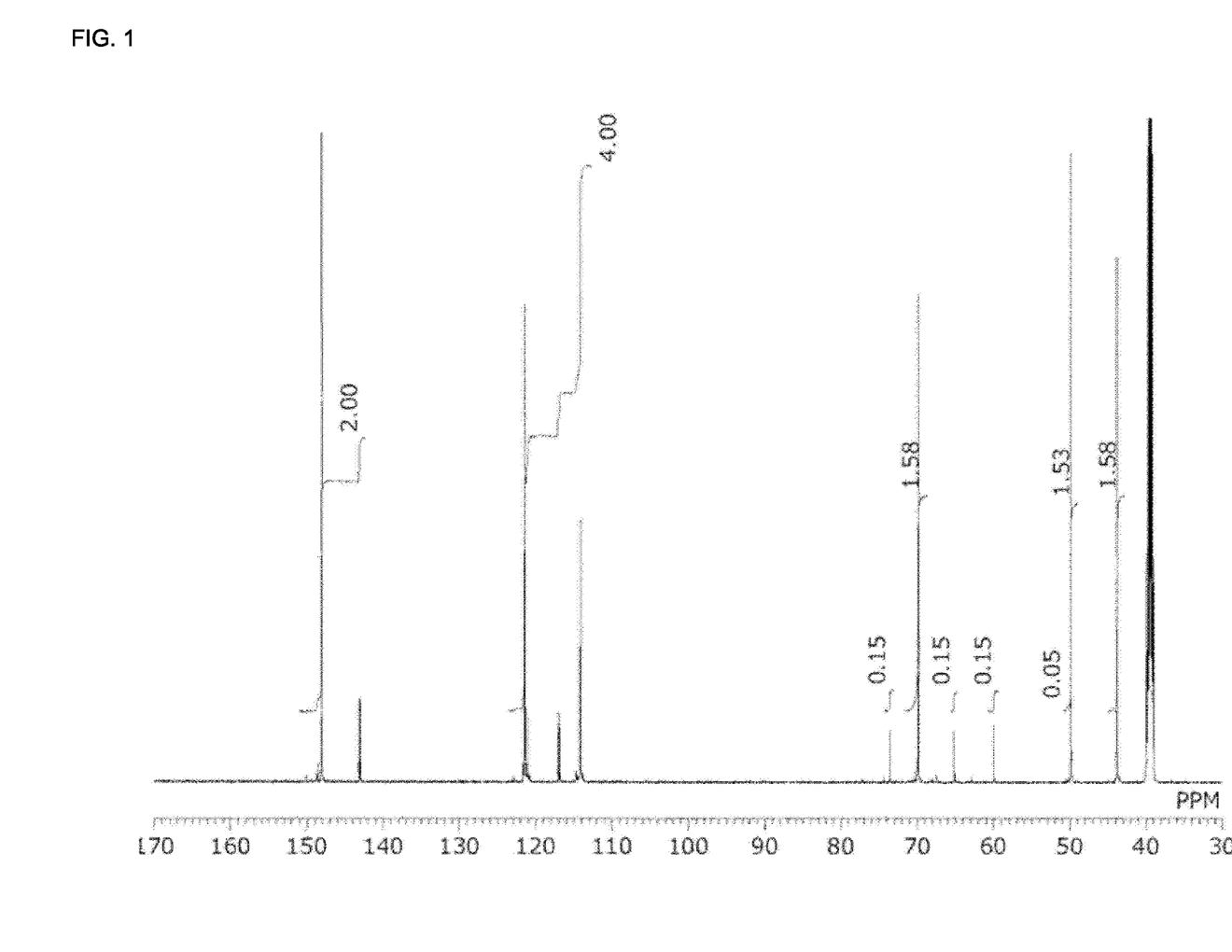
FIG. 1 is a $^{13}$C NMR chart of the epoxy resin produced in Synthesis Example 1.

To solve this, (A) was calculated from the ratio between the integrated area of the peak near 130 to 150 ppm, derived from an aromatic ring and corresponding to the ipso position of catechol, and that of the peak near 60 ppm, derived from a cyclic compound, in the $^{13}$C NMR measurement. (B) was calculated from the ratio between the integrated area of the peak near 130 to 150 ppm, derived from an aromatic ring and corresponding to the ipso position of catechol, and that of the peak near 50 ppm, derived from the epoxy group. The cyclic compound content determined in this way was 0.071 mol/100 g. The results of the $^{13}$C NMR measurement [chart] are FIG. 1.

The epoxy resin was also subjected to the measurement of the percentage area in GPC of 1,2-diglycidyloxybenzene (diglycidyl derivative of catechol). The amount of the diglycidyl derivative of catechol expressed as a percentage area in GPC was 88%.

The percentage area in GPC of oligomers was also measured. The oligomer content expressed as a percentage area in GPC was 1.3%.

The epoxy resin, moreover, was subjected to the measurement of its epoxy equivalent weight. Specifically, the epoxy equivalent weight of the epoxy resin was measured by the method of JIS K 7236: 2009. The epoxy equivalent weight of the epoxy resin determined in this way was 138 g/equivalent.

The viscosity of the epoxy resin was also measured. Specifically, the viscosity of the epoxy resin at 25° C. was measured using a cone-plate viscometer (TOKI SANGYO CO. LTD. TV-22). The measured viscosity of the epoxy resin was 190 mPa·s.

Synthesis Example 2

Figure 2:
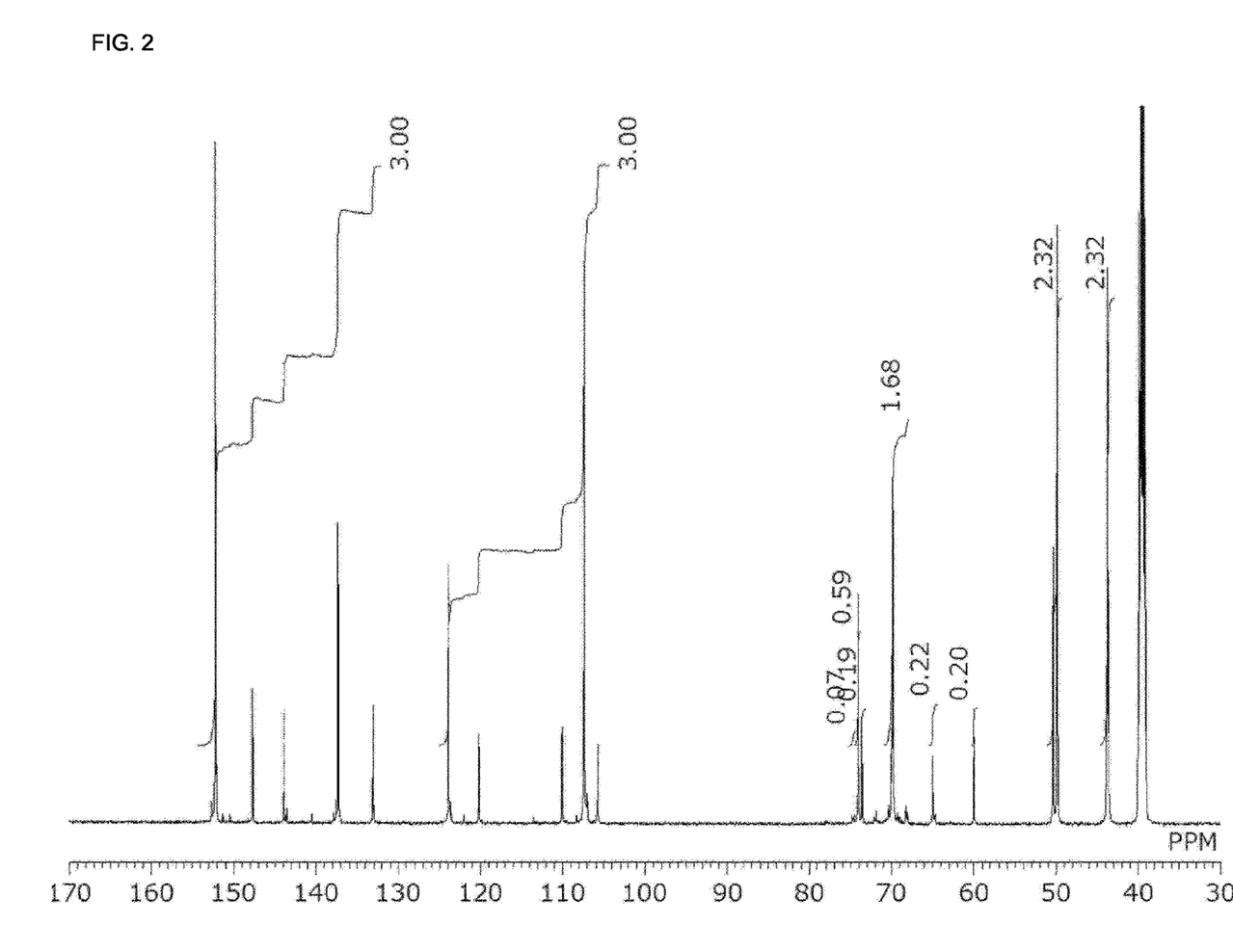
FIG. 2 is a $^{13}$C NMR chart of the epoxy resin produced in Synthesis Example 2.

An epoxy resin was produced in the same way as in Synthesis Example 1 except the 165 g (1.50 mol) of catechol in step (1) in Synthesis Example 1 was changed to 126 g (1.00 mol) of pyrogallol, the 566 g of MIBK was changed to 500 g, and the 167 g of water was changed to 147 g. The cyclic compound content, the percentage area in GPC of 1,2,3-triglycidyloxybenzene, the percentage area in GPC of oligomers, the epoxy equivalent weight, and the viscosity of the epoxy resin measured in the same way as in Synthesis Example 1 were 0.086 mol/100 g, 77%, 128 g/equivalent, and 3100 mPa·s, respectively. The results of the $^{13}$C NMR measurement [chart] are FIG. 2.

Examples 1 to 6 and Comparative Examples 1 to 5

Ingredients were blended in accordance with the formula (by mass) given in Table 1 below and uniformly mixed by stirring to give a curable resin composition. The composition was subjected to evaluation tests as described above. The results are presented in Tables 1 and 2.

The details of the ingredients used in the Examples and Comparative Examples are as follows.

Epoxy resin A-1: The catechol epoxy resin obtained in Synthesis Example 1

Epoxy resin A-2: The pyrogallol epoxy resin obtained in Synthesis Example 2

Epoxy resin A': DIC Corporation "HP-820"; epoxy equivalent weight, 210 g/equivalent Epoxy resin B: SYNASIA "S-720" (4,4'-methylenebis(N,N-diglycidylaniline)); epoxy equivalent weight, 111 g/equivalent Curing agent: Wakayama Seika Kogyo Co., Ltd. "SEIKA-CURE-S" (diaminodiphenylsulfone)

TABLE 1

| Example | | 1 | 2 | 3 | 4 | 5 | 6 |
|---|---|---|---|---|---|---|---|
| Epoxy resin A-1 | | 25 | 50 | 75 | | | |
| Epoxy resin A-2 | | | | | 25 | 50 | 75 |
| Epoxy resin B | | 75 | 50 | 25 | 75 | 50 | 25 |
| Curing agent | | 53.1 | 50.4 | 47.7 | 54 | 52.1 | 50.3 |
| Mechanical characteristics | Flexural strength [MPa] | 191 | 209 | 200 | 179 | 174 | 192 |
| | Flexural strain [%] | 6.5 | 6.9 | 5.5 | 6.7 | 6.7 | 7.4 |
| | Flexural toughness [MPa] | 7.1 | 8.8 | 7.4 | 7.0 | 7.1 | 9.0 |
| Curability | Gel time [min] | 11.0 | 10.0 | 9.0 | 9.5 | 7.5 | 5.0 |

TABLE 2

| Comparative Example | | 1 | 2 | 3 | 4 | 5 |
|---|---|---|---|---|---|---|
| Epoxy resin A-1 | | 100 | | | | |
| Epoxy resin A-2 | | | 100 | | | |
| Epoxy resin A' | | | | 100 | 50 | |
| Epoxy resin B | | | | | 50 | 100 |
| Curing agent | | 44.9 | 48.4 | 29.5 | 42.7 | 55.9 |
| Mechanical characteristics | Flexural strength [MPa] | 175 | 174 | 66 | 121 | 154 |
| | Flexural strain [%] | 4.1 | 5.4 | 1.5 | 2.9 | 4.8 |
| | Flexural toughness [MPa] | 5.8 | 5.6 | 0.5 | 2.0 | 4.1 |
| Curability | Gel time [min] | 8.0 | 5.0 | 19.0 | 14.0 | 14.0 |

The invention claimed is:

1. An epoxy resin composition comprising an epoxy resin (A) that is a product of reaction between an epihalohydrin and either catechol, optionally with an aromatic ring thereof methyl-substituted, or pyrogallol, optionally with an aromatic ring thereof methyl-substituted, and an aromatic glycidylamine epoxy resin (B);
   wherein the epoxy resin (A) contains a cyclic compound (a1) that has a cyclic structure whose constituent atoms include two oxygen atoms derived from oxygen atoms of either the catechol optionally with an aromatic ring thereof methyl-substituted or pyrogallol optionally with an aromatic ring thereof methyl-substituted; and
   wherein a cyclic compound (a1) content is between 0.040 and 0.115 mol per 100 g of the epoxy resin (A) of the catechol optionally with an aromatic ring thereof methyl-substituted or the pyrogallol optionally with an aromatic ring thereof methyl-substituted.

2. The epoxy resin composition according to claim 1, wherein an amount of a derived glycidyl ether (a2), represented by structural formula (1) or (2) below (1)

(2)

wherein, in formulae (1) and (2), G is a glycidyl group, each $R^1$ is independently a hydrogen atom or methyl group, m is an integer of 1 to 4, and n is an integer of 1 to 3,
in the epoxy resin (A) is 55% or more when expressed as a percentage area in GPC.

3. The epoxy resin composition according to claim 1, wherein the epoxy resin (A) further contains oligomers (a3), and an oligomer (a3) content is 12% or less when expressed as a percentage area in GPC.

4. The epoxy resin composition according to claim 1, wherein the epoxy resin (A) is a product of reaction between an epihalohydrin and pyrogallol, and an epoxy equivalent weight thereof is between 108 and 170 g/eq.

5. The epoxy resin composition according to claim 1, wherein the aromatic glycidylamine epoxy resin (B) is 4,4'-methylenebis(N,N-diglycidylaniline).

6. The epoxy resin composition according to claim 1, wherein a blend ratio between the epoxy resin (A) that is a product of reaction between an epihalohydrin and either catechol, optionally with an aromatic ring thereof methyl-substituted, or pyrogallol, optionally with an aromatic ring thereof methyl-substituted, and the aromatic glycidylamine epoxy resin (B) is between 10/90 and 90/10 when expressed as a ratio by mass represented by (A)/(B).

7. A curable resin composition comprising an epoxy resin composition according to claim 1 and a curing agent (C).

8. The curable resin composition according to claim 7, wherein the curing agent (C) is diaminodiphenylsulfone.

9. A cured form of a curable resin composition according to claim 7.

10. A fiber-reinforced plastic article comprising a cured form according to claim 9 and reinforcing fiber as essential components.

11. The fiber-reinforced plastic article according to claim 10, wherein a percentage by volume of the reinforcing fiber is between 40% and 85%.

12. A fiber-reinforced composite material comprising a curable resin composition according to claim 7 and reinforcing fiber as essential components.

13. The fiber-reinforced composite material according to claim 12, wherein a percentage by volume of the reinforcing fiber is between 40% and 85%.

14. A method for producing a fiber-reinforced plastic article comprising thermally curing a fiber-reinforced composite material according to claim 12.

* * * * *